(12) United States Patent
Sauter et al.

(10) Patent No.: US 8,239,306 B2
(45) Date of Patent: *Aug. 7, 2012

(54) COMPUTER-IMPLEMENTED METHOD OF CONSTRUCTING A STOCK INDEX

(75) Inventors: George U. Sauter, Malvern, PA (US); James D. Troyer, Drexel Hill, PA (US)

(73) Assignee: The Vanguard Group, Inc., Malvern, PA (US)

( * ) Notice: Subject to any disclaimer, the term of this patent is extended or adjusted under 35 U.S.C. 154(b) by 321 days.

This patent is subject to a terminal disclaimer.

(21) Appl. No.: 12/490,787

(22) Filed: Jun. 24, 2009

(65) Prior Publication Data
US 2009/0307120 A1 Dec. 10, 2009

Related U.S. Application Data

(63) Continuation of application No. 10/389,042, filed on Mar. 14, 2003, now Pat. No. 7,558,751.

(51) Int. Cl.
*G06Q 40/00* (2012.01)
(52) U.S. Cl. ..................................... 705/36 R
(58) Field of Classification Search ............... 705/36 R, 705/37, 35
See application file for complete search history.

(56) References Cited

U.S. PATENT DOCUMENTS

| | | | | |
|---|---|---|---|---|
| 5,761,442 A * | 6/1998 | Barr et al. | ............ | 705/36 R |
| 5,819,238 A * | 10/1998 | Fernholz | ............ | 705/36 R |
| 6,061,663 A * | 5/2000 | Bloom et al. | ............ | 705/36 R |
| 6,901,383 B1 * | 5/2005 | Ricketts et al. | ............ | 705/36 R |
| 7,181,425 B1 * | 2/2007 | Cha | ............ | 705/37 |
| 7,457,775 B1 * | 11/2008 | Cross | ............ | 705/36 R |
| 2002/0040336 A1 * | 4/2002 | Blanchard et al. | ............ | 705/36 |
| 2003/0065600 A1 * | 4/2003 | Terashima et al. | ............ | 705/36 |
| 2003/0065608 A1 * | 4/2003 | Cutler | ............ | 705/37 |
| 2003/0093350 A1 * | 5/2003 | Bloom et al. | ............ | 705/36 |
| 2004/0243492 A1 * | 12/2004 | Korisch | ............ | 705/35 |
| 2006/0149645 A1 | 7/2006 | Wood | | |

OTHER PUBLICATIONS

F.R. Johnston, et al. "Some Properties of a Simple Moving Average when Applied to Forecasting a Time Series," The Journal of the Operational Research Society, vol. 50, No. 12, (Dec. 1999), pp. 1267-1271.

MSCI Equity Indices Press Release, "MSCI Develops Enhanced Methodology for Its Global Value and Growth Indices," Geneva, Sep. 25, 2002, pp. 1-2.

(Continued)

*Primary Examiner* — Hani M Kazimi
(74) *Attorney, Agent, or Firm* — Panitch Schwarze Belizario & Nadel LLP

(57) ABSTRACT

Computer-implemented methods of creating and maintaining stock indexes are provided. For a stock index of a particular size, a band is defined around the upper and/or lower limits of the stock index. To be added to, or dropped from, a particular stock index, the stocks must fall outside of the bands for that particular stock index size. Stock migration is controlled using a systematic stock migration process so that stocks are gradually added and deleted from an index. Stock investment style is determined in a multi-dimensional process, instead of a linear process. Furthermore, the number of stocks in the stock index need not be a fixed value, but may depend upon how many stocks meet predefined criteria at any given point in time.

13 Claims, 13 Drawing Sheets

OTHER PUBLICATIONS

Russell, "The Russell indexes: State of the Art Performance Benchmarks," Frank Russell Company, 1995-2002, printout from: http://web.archive.org/web/20020208124525/russell.com/ww/indexes/default.asp, printout date: Dec. 5, 2007, pp. 1-2.

Ryan Sullivan et al., "Data-Snooping, Technical Trading Rule Performance, and the Bootstrap," The Journal of Finance, vol. 54, No. 5, (Oct. 1999), pp. 1647-1691.

Investopedia, "Market Capitalization," Investopeida 2000, archive.ord, (Feb. 26, 2001).

MSCI Equity Indices Press Release, "MSCI Announces Provisional Index Constituents," Geneva, May 19, 2001, pp. 1-2.

* cited by examiner

| Pure Value | Both Value And Growth |
|---|---|
| Neither Value Nor Growth | Pure Growth |

FIGURE 2

COMPUTER-IMPLEMENTED METHOD OF CONSTRUCTING A STOCK INDEX

CROSS-REFERENCE TO RELATED APPLICATIONS

This application is a continuation of U.S. application Ser. No. 10/389,042 filed Mar. 14, 2003, which is incorporated herein by reference.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

In 1896, Charles Dow created the Dow Jones Industrial Average, establishing the first broad measure of stock market performance and the first benchmark for portfolio performance. Limited by the technology of its times, the Dow painted a skeletal picture of the U.S. stock market. It initially consisted of just 12 stocks, weighted by their prices. As the original index, the Dow became the yardstick for relative performance.

Over the ensuing century, new technologies made it possible to create indexes that more accurately captured the performance of the U.S. stock market: for example, the Standard & Poor's 500 Index, the Russell 3000 Index, and the Wilshire 5000 Total Market Index (in ascending order of comprehensiveness). These indexes are weighted not by prices but by the market value of their constituents, and thus better represent the universe of securities available to U.S. investors.

In the mid- to late-1970s, however, a burgeoning industry of investment consultants recognized that these broad market indexes were inappropriate benchmarks for professional money managers. Most managers oversee portfolios that track not the broad market, but discrete sectors of it—stocks of a particular size, for example, or stocks with pronounced growth or value characteristics.

The consultants addressed the mismatch between managers and benchmarks by creating indexes of stocks in various capitalization ranges and of different investment styles. Since then, the industry has created multiple indexes to track every sector, industry, and sub-industry. The same has happened with bonds. There are few sectors of the financial markets that are not being sliced, diced, and tortured by an ever-growing list of index creators.

Despite the proliferation of indexes, these benchmarks have not precisely reflected the way managers actually invest. On balance, they measure the wrong set of securities or, if not that, then the wrong way of managing those securities. As evidence, research shows that the correlation between the performance of growth and value managers is much higher than the correlation between growth and value indexes. In other words, the growth and value indexes reflect a degree of difference in investment styles that doesn't exist in the real world. The same problems exist with indexes that represent other subsectors of the broad market.

It is indeed puzzling that two different indexes designed to provide insight into the same sector of the market—large-cap (capitalization) value stocks, for example—can provide very different results. The discrepancies arise because of differences in the methodologies used to create the indexes. Over long periods, different value and growth indexes generally, though not always, provide similar results. In the short run, however, their differences cause confusion and limit their usefulness as benchmarks.

A better approach to creating and maintaining indexes that provide meaningful benchmarks for money managers is needed.

BRIEF SUMMARY OF THE INVENTION

A first embodiment of the present invention provides a computer-implemented method of creating and maintaining a stock index. To implement the method, a stock size range is defined. The stock size range has an upper limit and a lower limit. A band is then defined around at least one of the upper limit and lower limit. For stock indexes other than for large-cap stocks, there are preferably bands defined around the upper limit and the lower limit. Large-cap stock indexes will have a band only around the lower limit if the upper limit is the largest stock in the market. The stock index is initially populated with stocks that fall within the upper limit and the lower limit of the size range. Periodically added to the index are stocks which fall within the stock size range and also fall outside of the band. Stocks in the index are periodically deleted if they fall outside of the stock size range and also fall outside of the band. The stock size may be based on market capitalization. There may be a plurality of consecutively defined stock size ranges, and the lower limit of the band of each stock size range can be made about equal to the upper limit of the preceding stock size range. The stocks that fall within the stock size range are determined without regard to whether shares of the stocks float on the stock market, but the shares selected for inclusion in the index are calculated to delete from the weighting shares of stocks that do not float on the stock market, such as shares which are closely held by individual investors, the same or other corporations, foundations, endowments, trusts or governments. The initial populating of the stock index may occur at any predefined current or past date. The number of different stocks in the stock index is preferably not fixed. Rather, the number of different stocks in the stock index may be determined by the number of stocks within the stock size range.

A second embodiment of the present invention provides another computer-implemented method of creating and maintaining a stock index. Each stock in the index must meet a predefined criteria. To implement the method, a predetermined time horizon is defined, and the time horizon is divided into a plurality of time periods. For each new time period, a packet of shares of stocks is selected for the index that meet the predefined criteria. The shares of stock represented in the index are defined as being the cumulative total of packets for the previous predetermined time horizon. The time horizon may be one year and the time period may be one month. If so, the cumulative total of packets for the previous predetermined time horizon is the previous twelve monthly packets.

A third embodiment of the present invention provides a computer-implemented method of creating a growth stock index and a value stock index for a universe of stocks. To implement the method, a first set of criteria is defined for ranking stocks based on growth. A growth hurdle is selected for classifying the stocks as being growth stocks based on the ranking. A second set of criteria is defined for ranking stocks based on value. A value hurdle is selected for classifying the stocks as being value stocks based on the ranking. A growth stock index is created using the stocks that exceed the growth hurdle even if the stocks that exceed the growth hurdle also exceed the value hurdle. A value stock index is created using the stocks that exceed the value hurdle even if the stocks that exceed the value hurdle also exceed the growth hurdle. Selected value and growth stocks may be present in both the value and the growth indexes. For the stocks present in both the value and growth index, the sum of their shares represented in these indexes does not need to sum up to the total shares represented in the universe of stocks. For example, for the stocks present in both the value and growth index, the sum of their shares may be twice the total shares represented in the universe of stocks. The number of different stocks in the stock index is preferably not fixed. Rather, the number of different stocks in the stock index may be determined by the number of stocks that exceed the respective hurdles.

A fourth embodiment of the present invention provides a computer-implemented method of creating a plurality of stock indexes for a universe of stocks. Each index has a different investment style. To implement the method, for each investment style, a set of criteria is defined for ranking stocks based on the style (i.e., how closely does each stock match the set of criteria). A hurdle is selected for classifying the stocks as being stocks having the style based on the ranking. A stock index is then created for the style using the stocks that exceed the hurdle even if the stocks that exceed the hurdle also exceed a hurdle for another style. Selected stocks may be present in more than one investment style. For the stocks present in more than one investment style, the sum of their shares does not need to sum up to the total shares represented in the universe of stocks. For example, for the stocks present in more than one investment style, the sum of their shares may be at least twice the total shares represented in the universe of stocks. There may be more than two investment styles in this embodiment. The number of different stocks in the stock index is preferably not fixed. Rather, the number of different stocks in the stock index may be determined by the number of stocks that exceed the respective hurdles.

Additional embodiments of the present invention include different combinations and subcombinations of the four embodiments described above.

BRIEF DESCRIPTION OF THE DRAWINGS

The above summary, as well as the following detailed description of a preferred embodiment of the invention, will be better understood when read in conjunction with the following drawings. For the purpose of illustrating the invention, the drawings show embodiments that are presently preferred. It should be understood that the invention is not limited to the precise arrangements and instrumentalities shown. In the drawings:

FIG. 2 shows a two-dimensional view of growth and value and illustrates a stock selection feature of the present invention;

DETAILED DESCRIPTION OF THE INVENTION

Figure 1A:
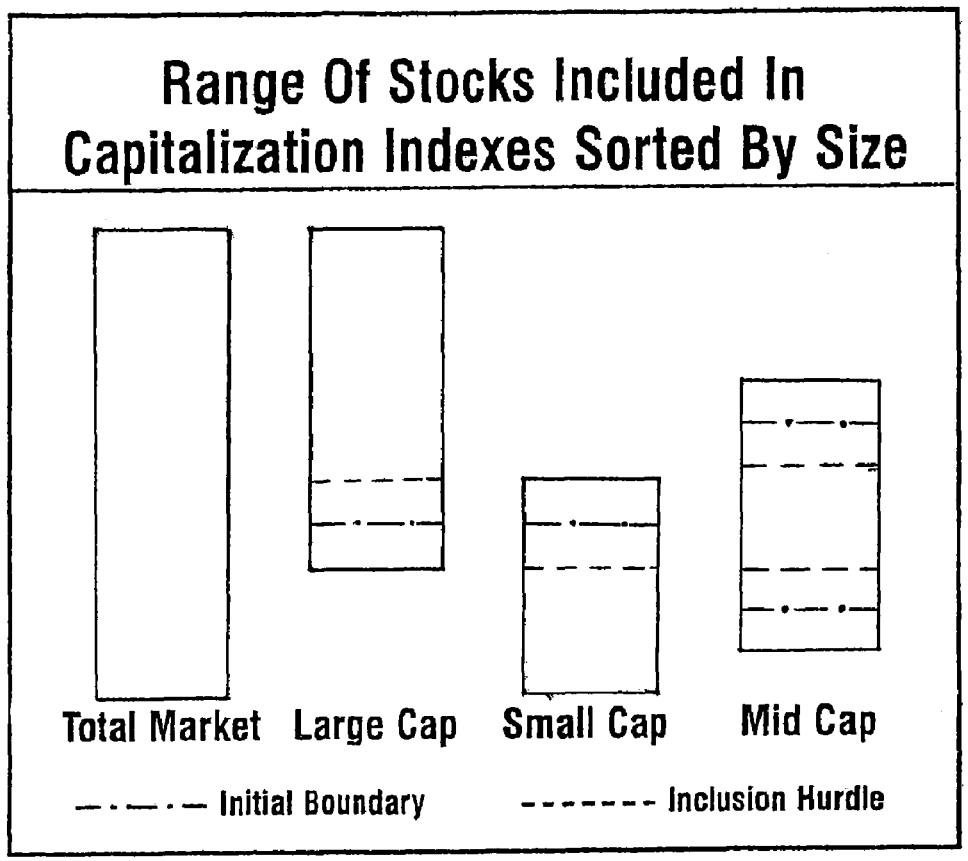
FIGS. 1A and 1B show a range of stocks included in market capitalization indexes sorted by size, and illustrate the banding feature of the present invention.

Certain terminology is used herein for convenience only and is not to be taken as a limitation on the present invention.

In the drawings, the same reference letters are employed for designating the same elements throughout the several figures.

1. Overview of Present Invention

It is possible to create and maintain indexes that are meaningful benchmarks for managers who follow specific investment styles (e.g., growth or value), focus on stocks of a particular size (e.g., large-cap or small-cap stocks), or look for some combination of those characteristics. The starting point is this cardinal rule: An index must reflect the way that money managers actually invest.

This rule may sound like circular reasoning—defining value as what people call value. The reality, however, is that growth and value, and small-cap and large-cap, are what investment managers deem them to be. Modern portfolio theory doesn't define any of those terms. Investors and managers do. The indexes that track these sectors should incorporate the thought processes of these managers. The best index isn't necessarily the one that provides the highest return; it is the one that most accurately measures the performance of the style that it is designed to track.

The present invention provides a set of guidelines for the construction and maintenance of ideal indexes. With better tools, investors will be able to make better decisions about how their money is managed. These guidelines are not intended to make the lives of index fund managers easier. An index fund is a rational investment only if it provides an alternative to active management in a low-cost, relatively tax-efficient way, or if it offers exposure to a segment of the market in which active management is difficult, if not impossible. For instance, micro-cap stocks are too illiquid to be managed actively in a portfolio with high turnover. Indexes designed only to simplify the lives of indexers probably wouldn't meet these criteria. However, if the rules for creating and maintaining indexes based on the behavior of active managers also simplify the indexers' job, so much the better.

The following five guidelines and rules are part of the index creation and maintenance process of the present invention.

A. Rely on Objective, not Subjective, Rules

An index can be rules-based and objectively maintained, with no ambiguity about when a stock should be included or excluded. Alternatively, an index can be more subjectively reconstituted by an individual or committee according to broad guidelines. Each approach has pros and cons.

A purely objective approach ensures absolute style integrity and total transparency, precluding debate about the merits of including one stock or another. However, it also can, but does not have to, result in short bursts of high turnover, raising costs and tax inefficiency. Active managers, even those with high portfolio turnover, don't implement six months' or a year's volume of portfolio adjustments on a single day.

On the other hand, a subjective approach to index maintenance may allow for more orderly management of changes. This approach, however, is subject to committee decisions that do not precisely represent the decision process of active management.

The most important characteristic of indexes tracking the market's subsectors—in essence, sectors created and defined by managers—should be that they accurately reflect the thought processes of active management. For that reason, style integrity is extremely important, and an objective set of rules for creating and maintaining an index is preferable to the vagaries introduced by a subjective process.

B. Adjust Weightings for Cross-Holdings/Float

For the purposes of determining a company's size and capitalization category, it is necessary to take into account all of a company's outstanding shares, because the stock's performance is influenced by the economic size of the company.

However, a different standard should be used in determining the stock's weight in an index.

The investment universe available to active investors should be the starting point for determining individual stock weights for all indexes. Many companies have shares that are closely held by individual investors, the same or other corporations, foundations, endowments, trusts or governments, or stock pledged as collateral. To the extent that these positions represent strategic long-term holdings that do not "float" on the market, they are not a part of active investors' opportunity set, and they should not be used to calculate the stock's weight in the index, and thus its contribution to the index's return. Including these shares in a benchmark distorts its return relative to the universe of active investors because, in aggregate, the managers cannot own all of the shares outstanding. In truth, there is probably no index-related issue less debatable than this. In fact, two major global indexes, the MSCI and FTSE indexes, have recently been reconstituted to adjust for shares that don't float. Although these changes resulted in hundreds of billions of dollars' worth of transactions for index and active funds, causing large transaction costs, those short-term costs will improve the long-term integrity of the indexes.

C. Define Market Capitalization as a Band, not a Line in the Sand

Indexes based on market capitalization must be periodically reconstituted to ensure that they reflect the performance of the market segment they purport to measure. Both objectively and subjectively determined indexes currently capture this concept, to varying degrees. In each case, the rebalancing usually results in significant market impact on the stocks affected and unnecessary turnover and transaction costs. This marketplace turmoil is not prima facie evidence of poor index construction. However, rebalancing as it is now practiced doesn't reflect how active managers adjust their portfolios, and, therefore, leads to the creation of an inappropriate benchmark.

Active managers do not unanimously agree on the boundaries between two capitalization ranges. One manager might classify a company having a $4 billion market capitalization as large-cap, while another might consider it mid-cap. To capture this ambiguity, an index's demarcation between capitalization ranges should be a band, not a line in the sand. If a stock's' relative market capitalization changes so that it enters the band, the stock remains a constituent in the index to which it was previously assigned, if any. It migrates to the other index only if it exits the opposite side of the band. A small-capitalization stock will remain in the small-cap index even if its market cap grows into the range that may have demarcated "large-cap" when the index was first established. It will become a large-cap stock only if its market capitalization moves past the upper edge of the small-cap band.

The advantages of these bands are twofold: First, they reduce turnover during periodic index rebalancings, as stocks would not vacillate between one index and another based on minor changes in their market capitalizations. Second, and more important, these bands more accurately reflect the way active managers think of their investment universe. Managers do not summarily throw a stock overboard because it crosses an imaginary line. They frequently continue to hold it even though a manager with a different investment style might consider it to be in a different index classification.

Building the Bands and Defining Capitalization Ranges

The capitalization bands are preferably based on the relative sizes of stocks (ordinal or percentile ranking), rather than on static dollar figures that may or may not be appropriate as the market rises and falls. For instance, the initial cutoff for a large-cap index may be the $700^{th}$-largest stock, as measured by total, as opposed to float-adjusted, market capitalization. Or it may be the stock representing the 85th percentile of the stock market's capitalization. (These boundaries are just suggestions, but they are roughly appropriate.)

The band around the large-capitalization cutoff may be plus or minus 150 stocks, or plus or minus five percentage points of market capitalization. A stock previously classified as small- or mid-cap would be added to the large-cap index once it became the 549th largest stock, or the stock representing the 79th percentile of cumulative market capitalization. Similarly, a stock would be removed from the large-cap index when it became the market's 851st largest stock, or the stock representing the 91st percentile of cumulative market capitalization.

The small-cap index should be a complement of the large-cap index, with an initial cutoff of perhaps 700 for the largest stock and, as suggested above, 2,500 for the smallest stock. (The absence of a mid-cap index separating large and small caps may seem odd, but this construction better reflects active managers' capitalization exposure.) The cutoffs should be bounded by the 300-stock bands used in the large-cap index. While the top cutoff may seem high, it reflects the holdings of small-cap managers. In fact, the performances of the Russell 2500 and Wilshire 4500 Indexes—both of which include mid-caps and small-caps—more closely correlate to the performance of small-cap managers than does that of the strictly small-cap Russell 2000 Index. Stocks smaller than the 2,500th stock could comprise a microcap index (a segment for which no index yet exists).

Figure 1B:
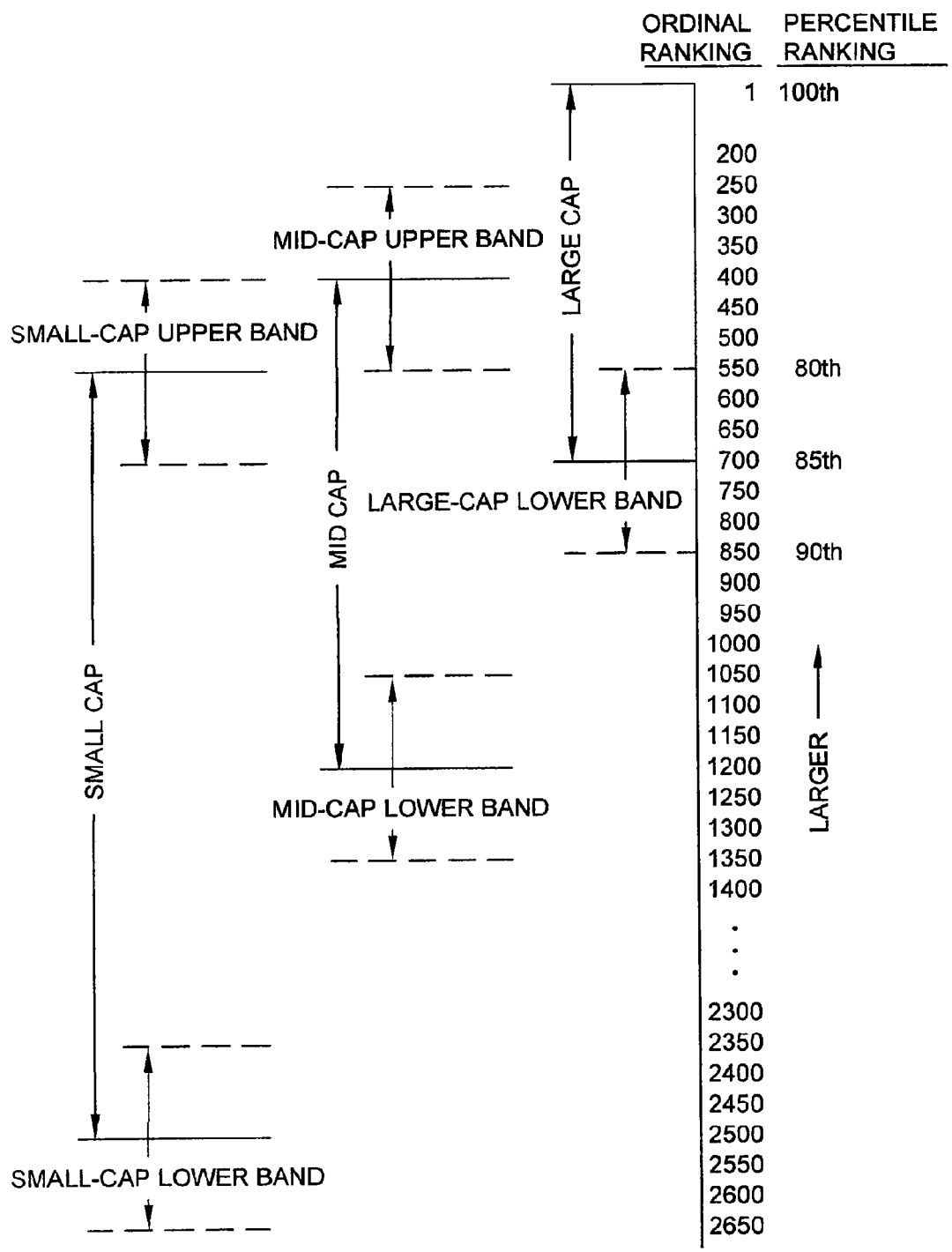

The mid-cap index may overlap the large-cap and small-cap indexes, with initial break points at perhaps the 400th-largest stock at the top and the 1,200th-largest stock at the bottom, with both cutoffs surrounded by, perhaps, 300-stock bands. FIG. 1A illustrates this concept generically. The first column shows the total stock market. The second column shows the universe of large-cap stocks; the third, that of small-cap stocks; and the fourth, that of midcap stocks. The dashed/dotted lines show the initial cutoffs for the different capitalization ranges. The dashed lines show the bands, or hurdles, that a stock must cross in order to move from one capitalization range to another. FIG. 1B illustrates this concept hypothetically in a graph that uses the actual numbers described above.

Some investors may be concerned that, because the mid-cap index overlaps the large- and small-cap indexes, the three together would not replicate the total stock market. But overlap is a problem that investors already face when combining two or more actively-managed funds, or even when complementing an active fund with an index fund. Active managers follow no hard-coded rules about market capitalization. Two managers with different mandates will frequently consider the same stock to be in their target ranges. An investor who wants a total-market index is better off investing in one directly than trying to build one with sub-indexes.

D. Determine Style (or Other Characteristics) in Two or More Dimensions

Most widely accepted indexes consider value and growth stocks to be complements of each other. By this definition, a growth stock is anything that is not a value stock, and a value stock is anything that is not a growth stock. The delineation typically depends upon a single factor, such as price/book ratio, or perhaps a combination of several factors blended into a single style rank for every stock, as depicted in the spectrum below:

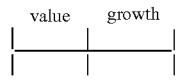

Active managers do not believe their world is flat. A value manager may hold a stock owned by a growth manager. The stock may fully satisfy the requirements of both. A value manager might require that a stock have a low price/earnings ratio, for example, but would certainly not be dismayed to see that it also enjoyed strong growth prospects. Nor would a growth manager exclude a stock that met his or her requirements for growth just because it sported a low valuation.

Using their own independent criteria, value and growth managers occasionally fish from the same pond. Conversely, some stocks are attractive to neither. For active managers, stocks don't fall into rank on a simple line like that shown above; instead, the delineation between value and growth is two-dimensional.

Value managers emphasize a company's fundamentals relative to its current price, including price/earnings, price/book, price/sales and dividend/price (yield) ratios. They analyze companies based on these criteria and subject those that pass a certain hurdle to further analysis. Growth managers, by contrast, place the primary emphasis on characteristics such as earnings growth, sales growth, and margin growth. Working independently, value and growth managers analyze companies along their own growth or value spectra. Their combined view is shown in the graphic of FIG. 2.

In two dimensions, some stocks are pure value or growth, others are both value and growth, while still others appeal to neither growth nor value managers. Based on a stock's price ratios, for example, a value manager might conclude that it is a value stock. Evaluating its sales and earnings growth, a growth manager might conclude that the same security is a growth stock. Using two distinct methodologies, both managers determine that the stock is a component of their universe. Style-based indexes should reflect this reality, rather than forcing a stock into one category or the other. Consequently, growth and value indexes, as subsets of broader indexes, should not be perfect complements.

Given this design, a combination of value and growth indexes will result in some overlap in holdings. It will also exclude some stocks. But that is true of actively-managed portfolios as well. As in the case of market cap-oriented funds, the combination of actively-managed growth and value funds does not yield a complete non-overlapping portfolio. If the investment style indexes are to be good benchmarks, they won't necessarily be perfect complements of each other. Index investors who want to combine value and growth should simply invest in an index fund that tracks a blended index.

This methodology further allows for creation of deep-value and aggressive-growth indexes by setting higher hurdles for those extreme styles. And as with the capitalization indexes, bands may be placed around the growth and value demarcations.

The value/growth concept may also be extended to cover all styles in multiple dimensions, as discussed in more detail below.

E. Manage Stock Migration

Although market-cap and style-oriented bands would reduce turnover and better reflect the way active managers respond to changes in stock characteristics, there would still be those hard lines in the sand at the edges of a band. When a company crossed this edge, the stock would exit the index, and in the case of size indexes, migrate entirely from one classification to another. Once again, this is not an accurate representation of how active managers respond to secular shifts in the characteristics of a company. In reality, because managers act independently, there is no one point, or even brief period, in which they collectively decide to eliminate a stock that is leaving their investment style. One by one, they may act quickly, but as a group they remove such stocks from their portfolios gradually.

How can an index be made to reflect this reality? One way is to divide the index into a plurality of time periods in a time horizon, such as 12 equally sized subcomponents, with each subcomponent associated with a month of the year. If Stock A had a market capitalization (or a float-adjusted market capitalization) of $12 billion, for example, each of the 12 subcomponents would contain $1 billion of Stock A. Every month, the subcomponent associated with that month would be opened up, analyzed, and reconstituted.

Figure 3:
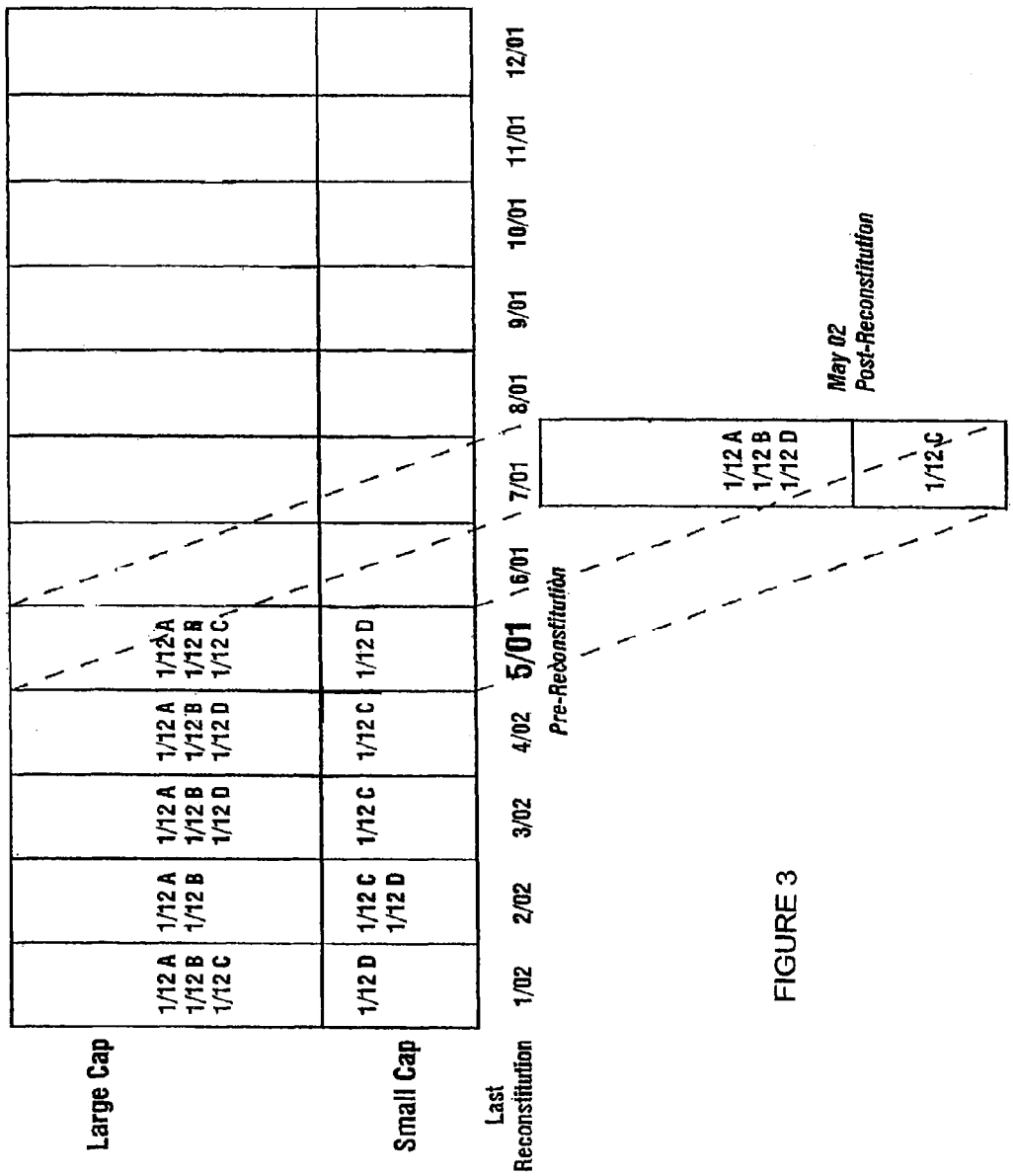
FIG. 3 shows a stock packetizing process in accordance with one embodiment of the present invention.
Figure 4A:
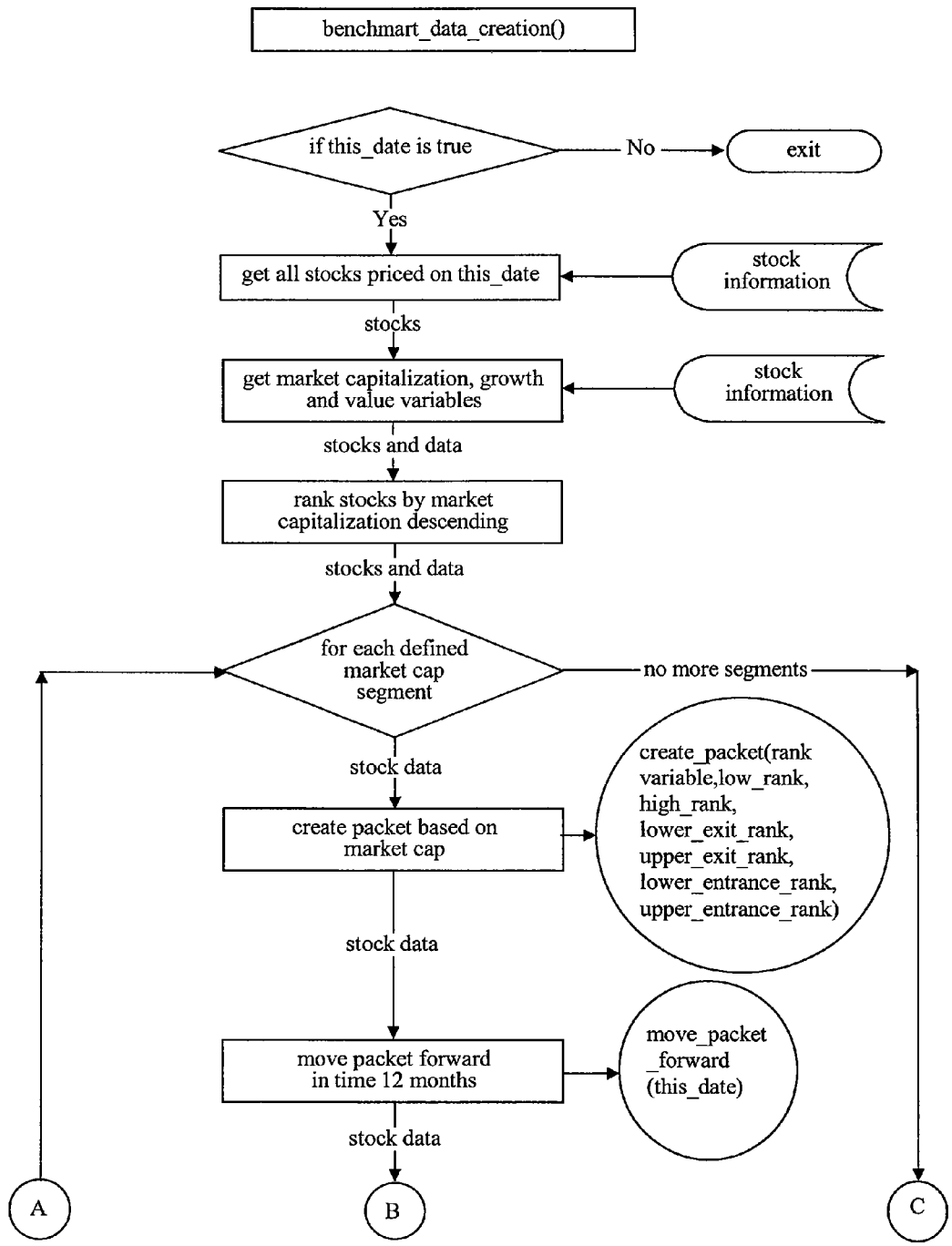
FIGS. 4A-4H, taken together, provide a detailed flowchart for performing the method.
Figure 4B:
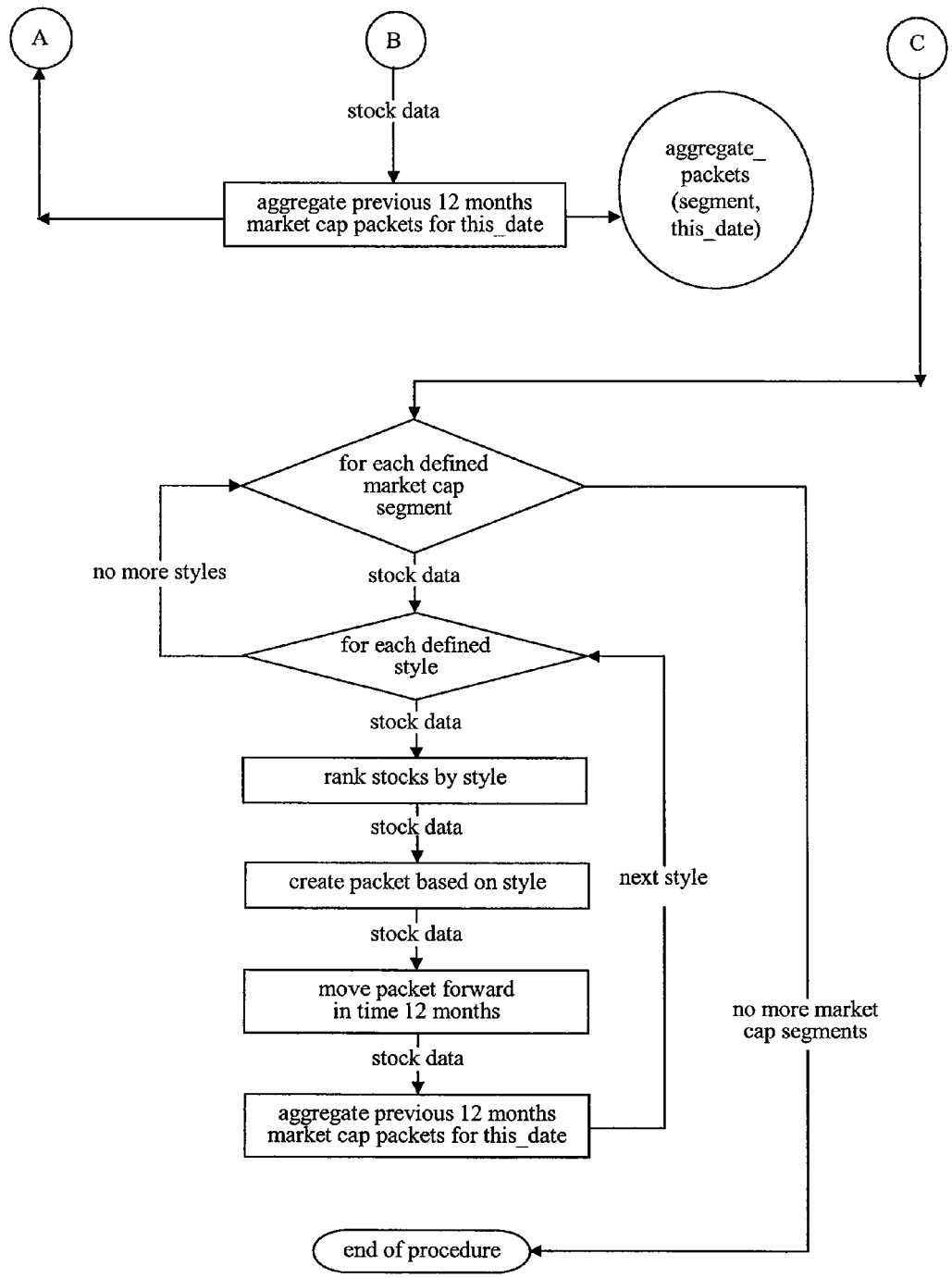
Figure 4C:
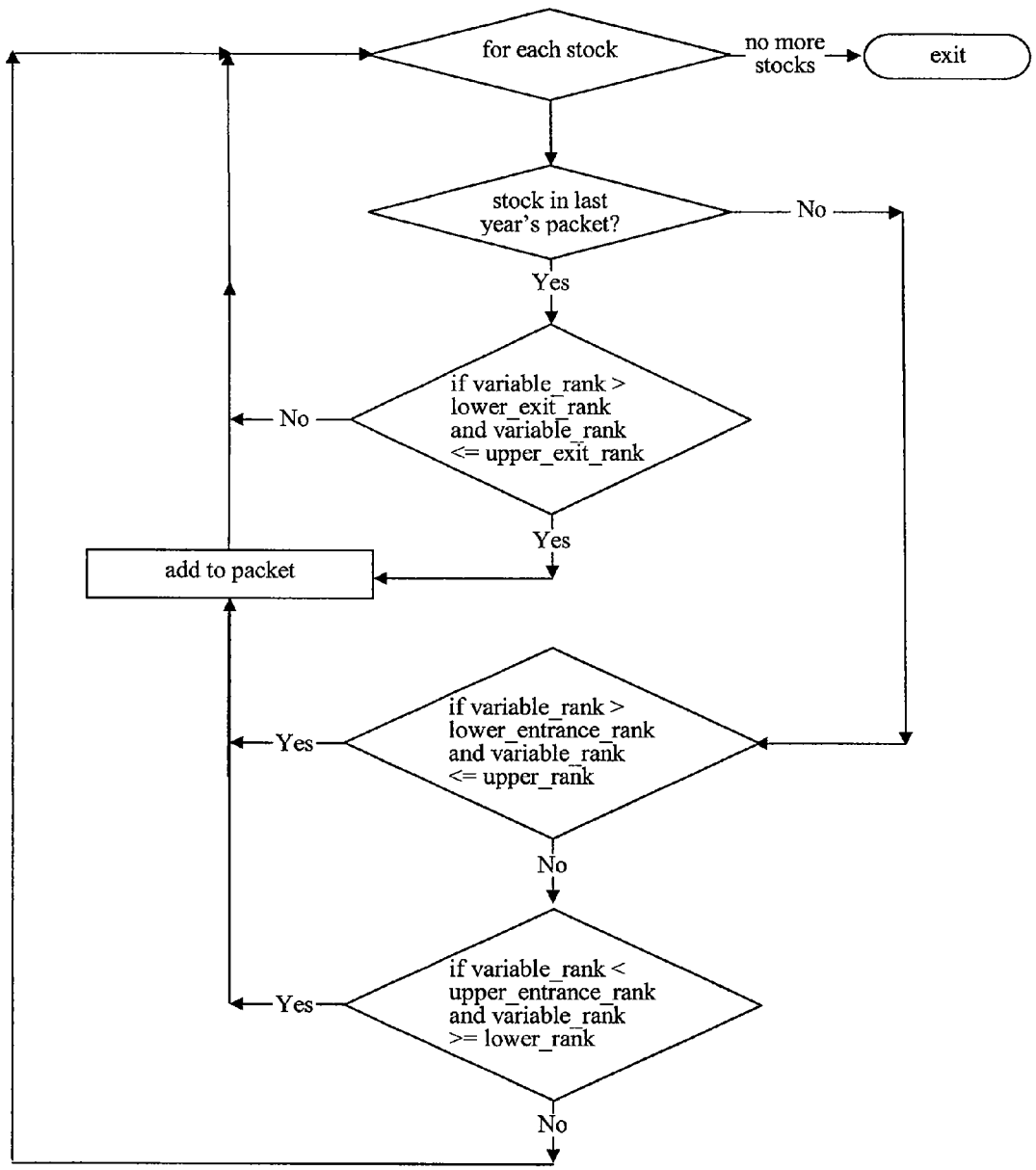
Figure 4D:
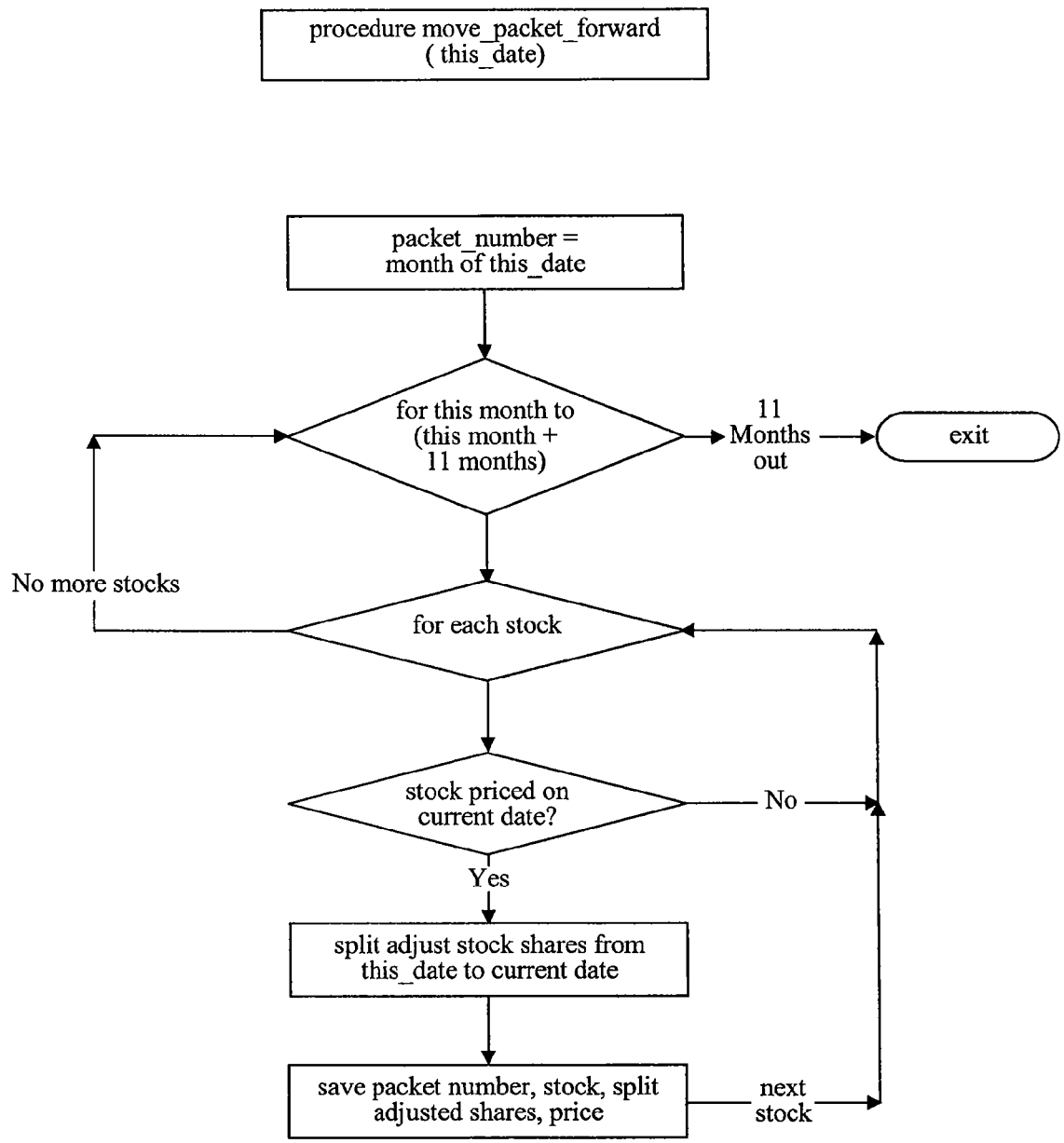
Figure 4E:
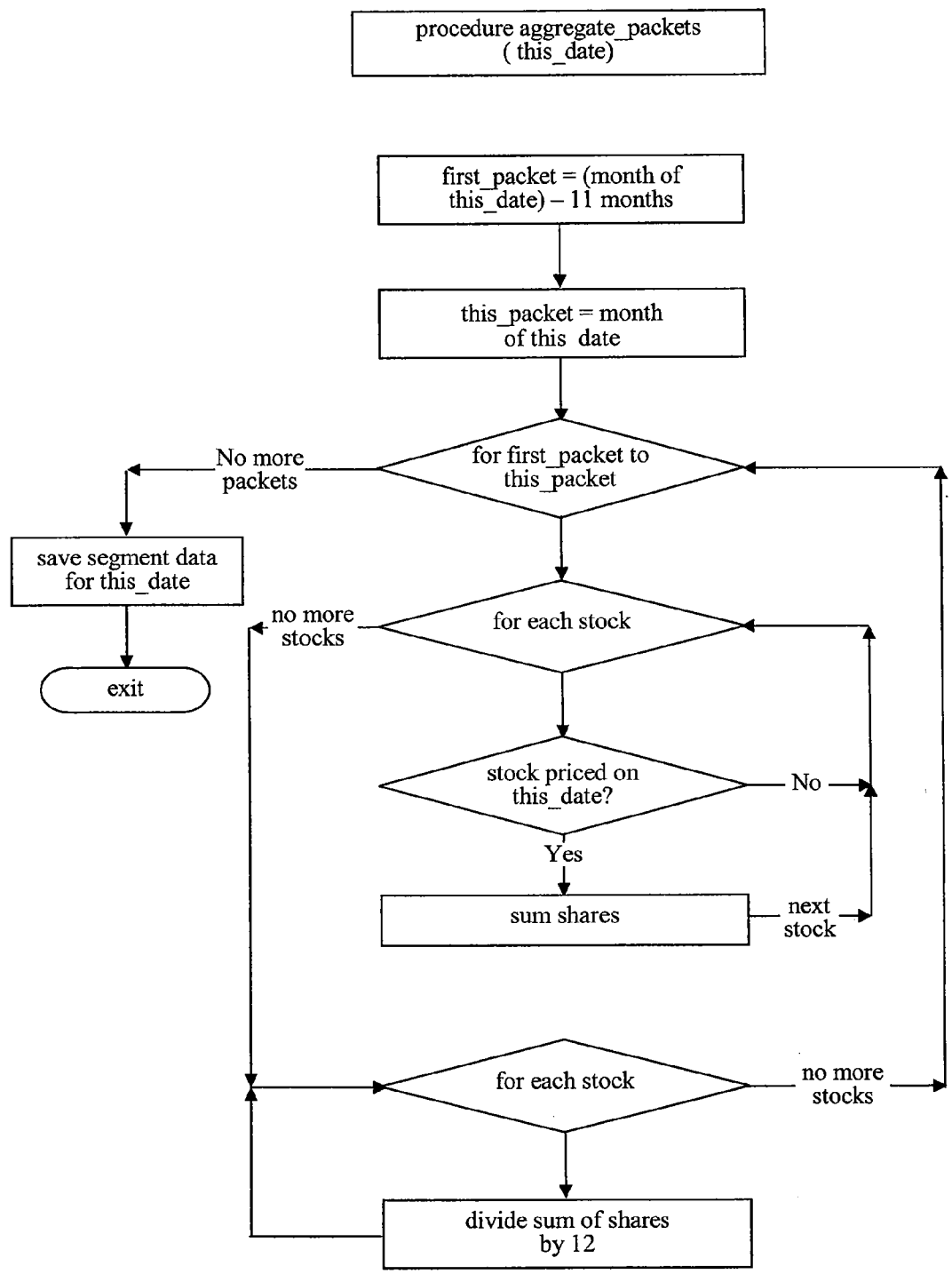
Figure 4F:
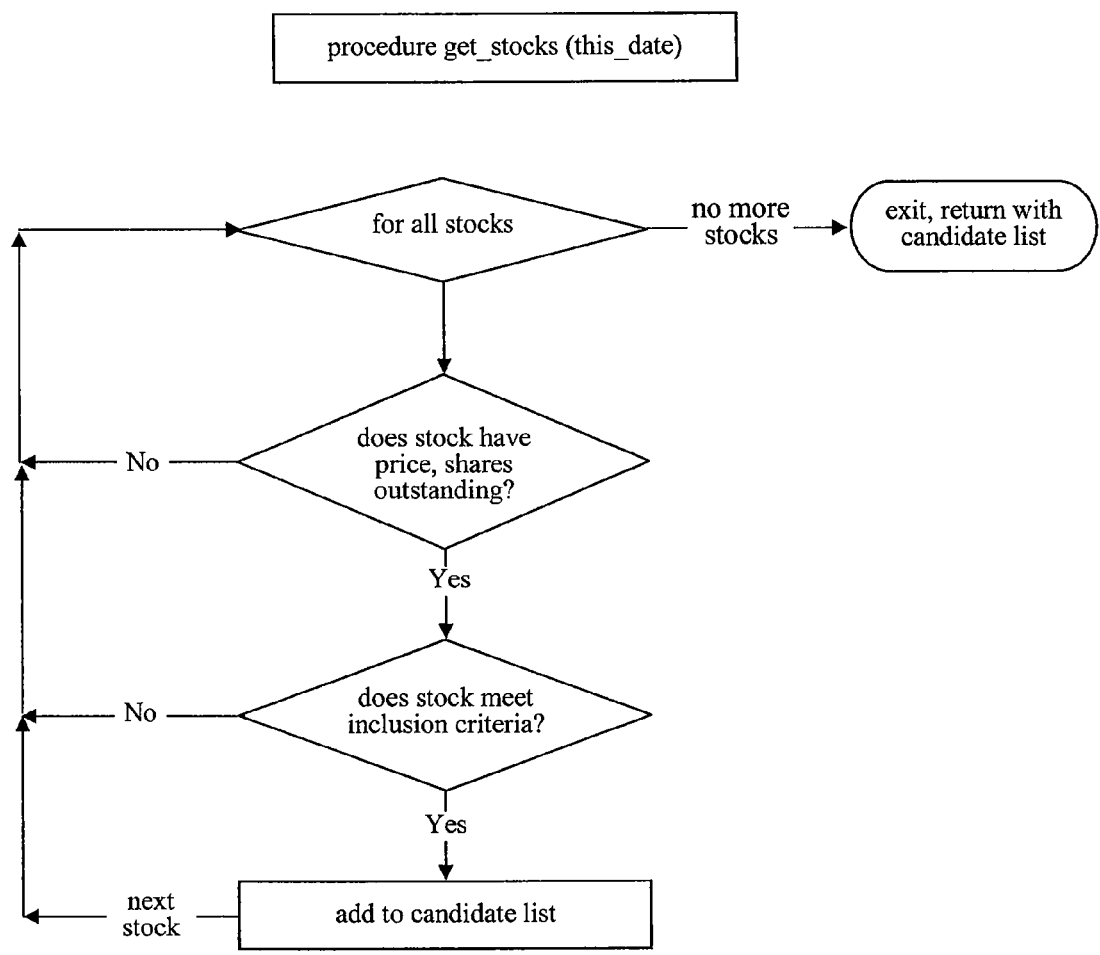
Figure 4G:
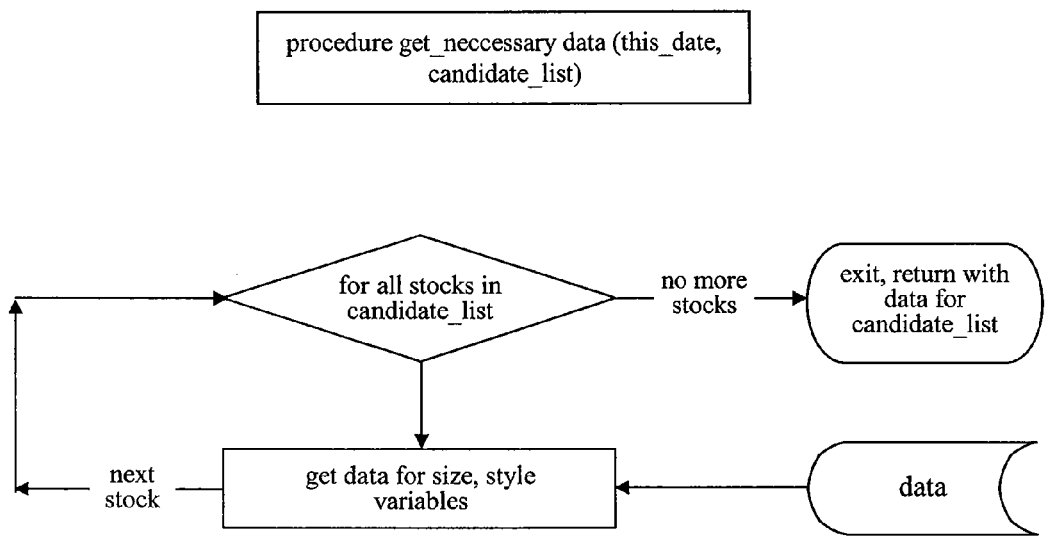
Figure 4H:
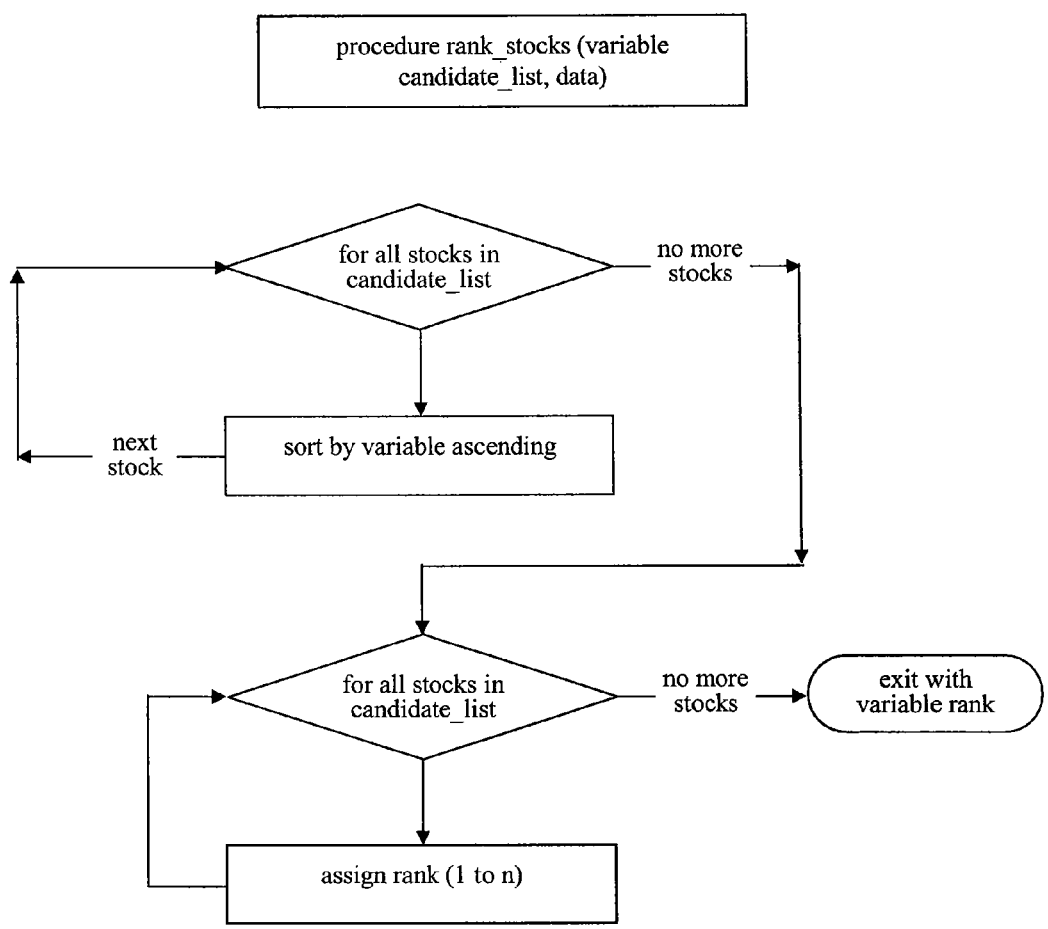

FIG. 3 shows how this might look, using an imaginary set of indexes being reviewed in May 2002. The index sponsor has opened that month's subcomponent, which was established in May 2001, and analyzed the stocks to determine whether they still meet the index criteria. In May 2001, Stocks A, B, and C were large-cap, and Stock D small-cap. A year later, Stock C has migrated down to the small-cap category, and Stock D has migrated up to the large-cap category. The subcomponent's $1/12$ position in Stock C is moved to the small-cap index, and its $1/12$ position in D is moved to the large-cap index. Adjustments made in the May subcomponent have no effect on the other 11 subcomponents.

This process means that, during any one month, only $1/12$ of a stock's float-adjusted market capitalization would be transferred from one index to another. At a minimum, it would take 12 months for a stock to entirely migrate from one index to another. During this transition period, the stock might be in two or more indexes, but the weights in the large- and small-cap indexes would be complementary. A particular stock might have $7/12$ths of its weight in the large-cap index, for example, and $5/12$ths in small-cap (and $12/12$ths in a mid-cap index).

This migration process more closely reflects how active managers invest. First, they do not, as a herd, pile into, or out of, a stock as it crosses a certain threshold. Instead, they collectively wade into and out of a position. An index that followed the same process would not only be a better benchmark, it would also benefit index fund investors by significantly reducing turnover and allowing the portfolio to be repositioned in a more orderly fashion, significantly reducing the fund's transaction costs by use of the monthly reconstitutions. The index itself would have lower embedded transaction costs, which would enhance long-term results.

It should be noted that most indexes currently lead to significant transaction costs when securities are added or subtracted. The cost of style integrity is disproportionately high for small-cap indexes, which have recently had annual turnover as high as 70% to 80%.

Summary Overview of Present Invention

To create relevant benchmarks for actively-managed investments, the appropriate frame of reference should be the active managers themselves. It is these managers, not investment theory, that define growth and value, small-cap and large-cap. With indexes that mimic the thought processes of active managers, investors would have better tools for evaluating the performance of professional managers, helping them to make smarter decisions about their portfolio allocation. Consultants and researchers would also have better tools for attributing a portfolio performance to the returns of different investment styles.

A widespread misconception is that indexing works in large caps, but not in sectors such as small caps. At times, this conclusion appears to be supported by the data. But the real lesson of the data is that managers are being measured with the wrong yardsticks. With better benchmarks, outperforming—or underperforming—an index would no longer be a matter of holding stocks from a different universe. Performance would reflect the success of a manager's stock selections within the appropriate universe. Although it is unlikely that large numbers of active managers could boast of index-beating performance, even over short periods, these better indexes could in fact be a boon to talented active managers. Their relative success could be attributed to skill, not dismissed as an artifact of faulty benchmark construction.

2. Detailed Description

The present invention provides a computer-implemented method for creating and maintaining stock indexes using one or more of the rules and techniques described above.

FIGS. 4A-4H, taken together, provide a self-explanatory detailed flowchart for performing the method in accordance with one embodiment of the present invention.

The Appendix below is self-explanatory pseudocode for one implementation of a software program that performs the method in accordance with the flowchart.

An algorithm for investment benchmarks in accordance with one embodiment of the present invention is as follows:
Create Total Investable Universe Identify the top 40% of names, sorted by market capitalization for each month. Exclude REITS, foreigns, units, indices, etc. Each month is a PACKET. Each packet is stable for 12 months. For any month, there is a January packet, a February packet, a March packet, etc. If this is June, the January packet was created on January 31 and held stable for each month.

For each month end, combine the 12 months' packets (shares outstanding/12) on that month to create that month's Universe.
Divide Total Market into Large, Medium and Small Based on cumulative percent of market capitalization, divide Total Universe into Large, Medium and Small benchmarks. All stocks <=85% of cumulative market cap go into a Large packet. Stocks from 85% to 100% of cumulative market cap are in a Small packet. Stocks from 75% to 92% of cumulative market cap make up the Mid packet.

Combine 12 months of packets (shares outstanding/12) to form large, mid and small universes.
Value and Growth Value is defined as the average of the ordinal ranks of Sales/Price, EBITD/Price, Book/Price, and Yield. This average is ordinally ranked for Large, Medium and Small universes. A stock in two universes will have two different value ranks. Stocks with a value <=0.50 go into a packet automatically. Stocks>0.5 and <=0.6, that were in the packet 12 months ago stay in.

Combine the 12 packets to create the Value universe.

Growth is defined as 50% IBES Long-Term growth ordinal rank, 25% 5 year Sales Growth and 25% 5 year EPS Growth. Again, the average is ordinally ranked for each universe. Stocks <=0.55 go into a packet. Stocks from 0.55 to 0.65 that were in the packet 12 months ago stay in.

Combine the 12 packets to create the Growth universe.

Figure 5:
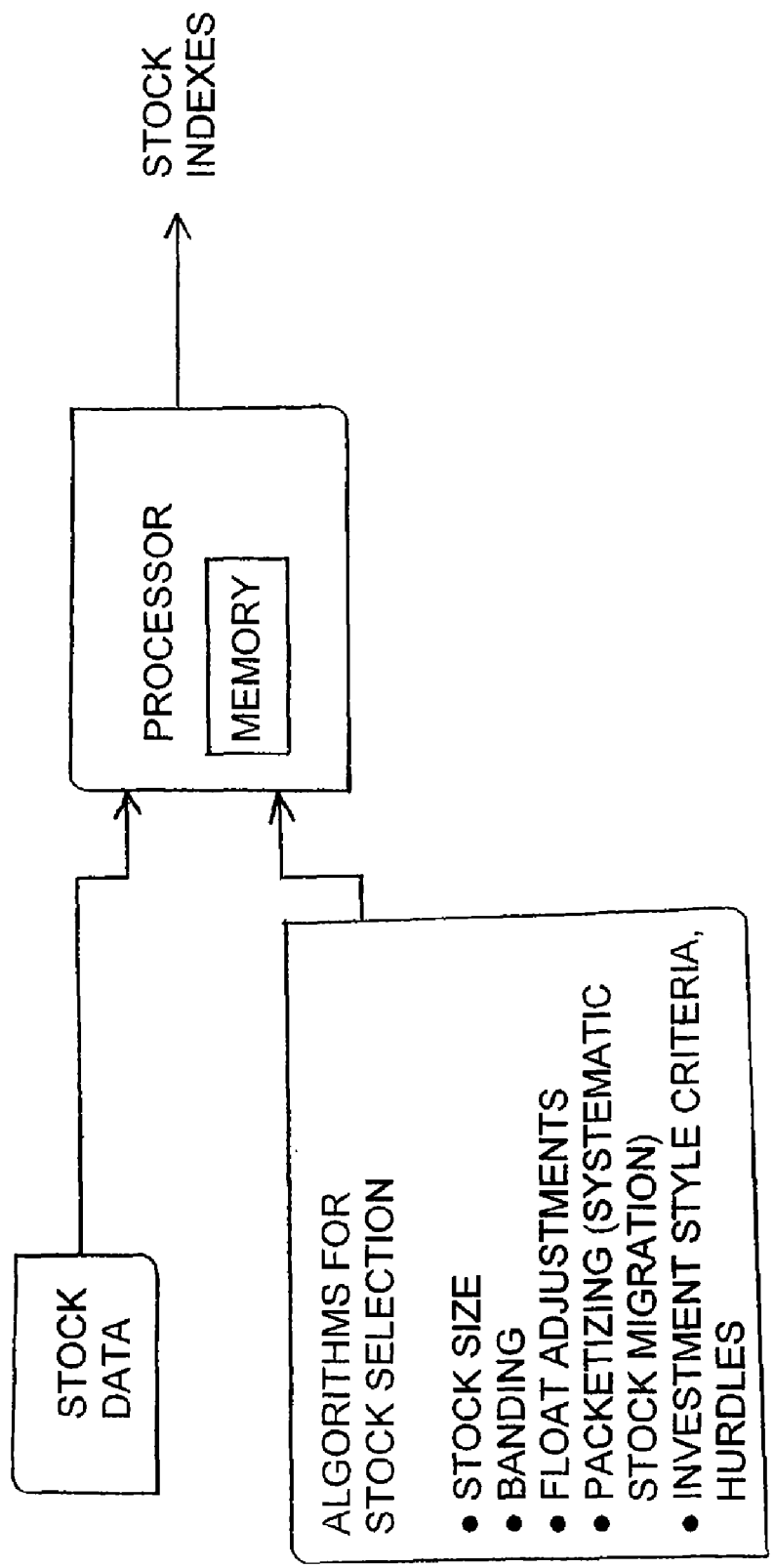
FIG. 5 shows a block diagram of one embodiment of a computer-implemented system which creates and maintains stock indexes.

FIG. 5 shows a block diagram of one embodiment of a computer-implemented system which creates and maintains stock indexes. Stock data and the algorithms for stock selection are input into a processor which creates the indexes. The stock data may be obtained from any commercially available source. The processor may be any general-purpose computer.

Stock size is typically measured based on market capitalization. However, the stock size may alternatively be based on other factors, such as total sales of the company, total profits of the company, or total traded volume. The scope of the present invention includes ways to characterize a stock size, other than by market capitalization.

The guidelines and rules described above are equally applicable to sector indexes and country indexes.

The most common stock investment styles are value and growth. However, the scope of the present invention includes other types of investment styles, such as momentum or GARP (i.e., growth at a reasonable price). Thus, the investment style process may be multi-dimensional, allowing for three or more different styles, while still allowing the same stock to overlap more than one style.

As discussed above, most conventional indexes do not allow a particular stock to fall within two different investment styles. However, some conventional indexes, such as the Russell 2000, allow a stock to span two investment styles, such as growth and value. When a stock spans two investment styles, the combination of the weightings of the growth and value shares always sums up to the market segment. For example, if a particular stock has half of the attributes of a growth stock and half of the attributes of a value stock, the growth index will be weighted with 50% of the stock, and the value index will be weighted with 50% of the stock. Other splits can be made, but the total will always equal 100%. In the present invention, stocks which fall within a particular investment style are always weighted at 100%, regardless of whether the stock also falls within another investment style. The total weightings thus need not sum up to the market segment.

Stated another way, the investment style feature of the present invention is unlike conventional definitions of style. The definition as defined in the present invention allows for the sum to be greater or less than the parent. For example, the growth and value segments of the S&P and Russell indexes when combined always equal the value of their respective parent segments. Since in the definition of the present invention, a stock could be considered to be both fully exposed to growth and to value, its full weight could appear in both style segments, and the combination of the two segments could contain twice the weight of that stock relative to the parent segment.

Conventional indexes typically require a specific number of stocks to be included in the index. This process increases the amount of decisions that must be made by the index manager and/or committee, and adds another layer of subjectivity to the index. The indexes created by the present invention do not have any requirements regarding the number of stocks to include in the index. Once the criteria for the index is set, e.g., large-cap value stocks, then the number of stocks in the index is objectively based on the number of stocks that meet the criteria at a particular point in time. For example, a wave of mergers may increase the number of stocks in a large-cap index, whereas a wave of divestitures may increase the number of stocks in a small-cap index.

The time that is selected to initially populate a stock index may cause the current constituents of the index to be slightly different. The scope of the present invention is not limited to any particular rules regarding the time for initial population. Since one goal of the present invention is to measure large, systematic factors in the stock market, the specific constituents of the index on any given time is not significant. The contribution of an individual stock to the index return tends to be overwhelmed by the systemic returns in the market.

Referring to the packet/systematic stock migration process, the time periods in which the time horizon is divided into may be fixed (e.g., one month, semiannually, annually), or dynamic. Also, the time periods need not be equal. For example, stock activity is not constant all year long, and certain times in a year are historically more important than others, such as the end of the year or months that span fiscal quarters. It may be advantageous to divide the packets into unequal time periods. Dynamic time periods may be useful when specific countries have reporting conventions that group financial reporting into one or two periods. In such a case, it may be beneficial to have some time periods of different length.

As discussed above, the packet of shares of stocks selected for each new time period may be market cap weighted. However, the cumulative total of packets will not necessarily be exactly market cap weighted, but will be relatively close to being market cap weighted.

As discussed above, some active managers inherently do systematic stock migration, but they do not employ any systematic, formulaic, and objective approach to doing so, as set forth in the present invention. Applying systematic stock migration to indexes is both complicated and not intuitive, and thus is not done today. Indexes, and the index funds that follow the index, are typically managed so as to always have a specific list of stocks to be included, as well as a specific number of stocks. Systematic stock migration requires partial weightings of stock for stocks that are migrating into and out of the index. An index that uses systematic stock migration also will not have a fixed number of stocks, since the number of stocks that are in migration varies over time.

The number of different stocks in the stock index is preferably not fixed. Rather the number of different stocks in the stock index may be determined by the number of stocks within the stock size range and/or the number of stocks that meet a predetermined style. However, the scope of the invention also includes embodiments wherein the number of different stocks in the stock index is fixed, but the other principles of the present invention (e.g., banding, packetizing, stock selection for investment styles) are still applied. In this manner, the principles of the present invention may be applied to conventional stock indices, such as the Standard & Poor's 500 Index and the Russell 3000 Index. If a fixed number of stocks is to be used, the algorithm that accumulates the packets would be slightly modified to make the number of stocks constant.

The scope of the present invention includes any methods for creating and maintaining stock indexes, regardless of how the stock indexes are ultimately used. Once a stock index is created, it may be directly used by a money manager to select stocks for a stock fund comprised of client accounts, or it may be used by an index provider to advise a money manager on the selection of stocks. These uses of a stock index, as well as other potential uses of a stock index, are within the scope of the present invention.

Index funds have coexisted with actively managed funds for many years. Nonetheless, indexes and their respective funds have not adopted many of the highlighted practices of active funds. The very idea that indexes and their respective index funds should incorporate practices of active funds is itself not intuitive and thus inventive. The present invention provides specific objective ways for an index, and a fund that tracks an index, to incorporate such active fund practices, thereby providing the best of both worlds, namely, the better practices of active funds and the cost advantages and tax efficiency of indexes, and thus index funds.

The present invention may be implemented with any combination of hardware and software. If implemented as a computer-implemented apparatus, the present invention is implemented using means for performing all of the steps and functions described above.

The present invention may be implemented with any combination of hardware and software. The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

APPENDIX

```
procedure benchmark_data_creation( )
    while (this_date)
        get_stocks( )
        get_necessary_data( )
        rank_stocks( market cap)
        for (each defined market cap segment)
            create_packet(market cap, low_rank, high_rank, lower_exit_rank,
                    upper_exit_rank, lower_entrance_rank, upper_entrance_rank )
            move_packet_forward(this_date)
            aggregate_packets(this_date)
        end for
        for (each market cap segment)
            for (each defined style)
                rank_stocks( style variable )
                create_packet(style, low_rank, high_rank, lower_exit_rank,
                        upper_exit_rank, lower_entrance_rank, upper_entrance_rank )
                move_packet_forward(this_date)
                aggregate_packets(this_date)
            end for
        end for
    end while
end procedure
procedure get_stocks ( )
```

APPENDIX-continued

```
      for (all_stocks)
         if (stock_meets_inclusion_criterion( ))
            add stock to candidatelist
         end for
   end procedure
   procedure get_necessary_data( )
      for (all stocks)
         get_market_capitalization( )
         get_growth_and_value_score( )
      end for
   end procedure
   procedure rank_stocks (variable)
      sort stocks by variable ascending
      for (each stock)
         assign rank
      end for
   end procedure
   procedure create_packet (variable, low_rank, high_rank, lower_exit_rank, upper_exit_rank,
                     lower_entrance_rank, upper_entrance_rank)
# low_rank     : rank that defines the lower boundary of the packet. For a segment that
                 includes stocks from rank 100 to 200, this value = 100
# high_rank    : rank that defines the upper boundary of the packet. For a segment that
                 includes stocks from rank 100 to 200, this value = 200
# lower_exit_rank  : defines the lower exit boundary for stocks leaving the packet. For a segment that
                 includes stocks from rank 100 to 200, this value could = 50. A stock that was
                 in this packet last creation period would have to have a rank < 50 to leave the packet
# upper_exit_rank  : defines the upper exit boundary for stocks leaving the packet. For a segment that
                 includes stocks from rank 100 to 200, this value could = 250. A stock that was
                 in this packet last creation period would have to have a rank > 250 to leave the packet
# lower_entrance_rank : defines the lower entrance boundary for stocks entering the packet. For a segment that
                 includes stocks from rank 100 to 200, this value could = 150. A stock that was not
                 in this packet last creation period would have to have a rank > 150 and a rank <= 200
                 to enter the packet
# upper_entrance_rank : defines the upper entrance boundary for stocks entering the packet. For a segment that
                 includes stocks from rank 100 to 200, this value could = 150. A stock that was not
                 in this packet last creation period would have to have a rank < 150 and a rank >= 100
                 to enter the packet
      for (all stocks)
         if (stock in last years segment packet) {
            if (stock variable > lower_exit_rank and stock < upper_exit_rank) add to segment
         }
         else {
            if (stock variable > lower_entrance_rank and <= upper_rank) add to segment
            if (stock variable < upper_entrance_rank and >= lower_rank) add to segment
         }
      end for
   end procedure
   procedure move_packet_forward( this_date )
      packet_number = month of (this_date)
      for (next 11 months from this date)
         for (each stock)
            split adjust shares from this_date to month end
            drop stock if no longer pricing
            save packet_number, stock, shares
         end for
      end for
   end procedure
   procedure aggregate_packets(segment, this_date)
      first_packet = month(this_date - 11 months)
      this_packet = month(this_date)
      for (first_packet to this_packet)
         for (each stock)
            sum shares from each packet
         end for
      end for
      for (each stock)
         divide shares by 12
         save segment
      end for
   end procedure
```

What is claimed is:

1. A computer-implemented method of creating and maintaining a stock index, the method comprising:
   (a) defining a stock size range and inputting the stock size range into a processor, the size range having an upper limit and a lower limit;
   (b) defining a band around at least one of the upper limit and lower limit of the stock size range and inputting the band into the processor, wherein the band is a range of values between two limits;
   (c) executing a software program in the processor that:
      (i) initially populates the stock index with stocks that fall within the upper limit and the lower limit of the size range;
      (ii) periodically adds stocks to the index which fall within the stock size range and also fall outside of the band; and
      (iii) periodically deletes stocks from the index which fall outside of the stock size range and also fall outside of the band.

2. The method of claim 1 further comprising:
   (d) defining a predetermined time horizon and inputting the time horizon into the processor, wherein step (c) further comprises:
      (iv) dividing the time horizon into a plurality of time periods;
      (v) for each new time period, defining a packet of shares of stocks as being the stocks in the index as determined by step (c); and
      (vi) defining the shares of stock represented in the index as being the cumulative total of packets for the previous predetermined time horizon,
   wherein the time horizon is one year and the time period is one month, the cumulative total of packets for the previous predetermined time horizon thereby being the previous twelve monthly packets.

3. The method of claim 1 further comprising:
   (d) defining a predetermined time horizon and inputting the time horizon into the processor, wherein step (c) further comprises:
      (iv) dividing the time horizon into a plurality of time periods;
      (v) for each new time period, defining a packet of shares of stocks as being the stocks in the index as determined by step (c); and
      (vi) defining the shares of stock represented in the index as being the cumulative total of packets for the previous predetermined time horizon,
   wherein the time horizon is divided into a number of equal length time periods.

4. The method of claim 1 further comprising:
   (d) defining a predetermined time horizon and inputting the time horizon into the processor, wherein step (c) further comprises:
      (iv) dividing the time horizon into a plurality of time periods;
      (v) for each new time period, defining a packet of shares of stocks as being the stocks in the index as determined by step (c); and
      (vi) defining the shares of stock represented in the index as being the cumulative total of packets for the previous predetermined time horizon,
   wherein the time periods are dynamic.

5. The method of claim 1 wherein the stocks that fall within the stock size range are determined without regard to whether shares of the stocks float on the stock market, and wherein step (c) further comprises:
   (iv) weighting the shares that are selected for inclusion in the index to delete from the weighting shares of such stocks that do not float on the stock market.

6. The method of claim 5 wherein the shares deleted in step (c)(iv) include shares which are closely held by individual investors, the same or other corporations, foundations, endowments, trusts or governments.

7. The method of claim 1 wherein the stock size is based on market capitalization.

8. The method of claim 1 wherein there are a plurality of consecutively defined stock size ranges, and the lower limit of the band of each stock size range is equal to the upper limit of the preceding stock size range.

9. The method of claim 1 wherein the initial populating of the stock index in step (c)(i) may occur at any predefined current or past date.

10. The method of claim 1 wherein the number of different stocks in the stock index is not fixed and is determined by the number of stocks within the stock size range.

11. The method of claim 1 wherein the number of different stocks in the stock index is fixed.

12. The method of claim 1 wherein the band is defined around the upper limit and the lower limit.

13. The method of claim 1 wherein the stocks are added and deleted on a monthly basis.

* * * * *